May 3, 1966  A. W. FOWLER  3,249,533
METHOD FOR CLEANING WATER TO REMOVE FOREIGN PARTICLES
SUCH AS PAINT
Filed Jan. 17, 1962  10 Sheets-Sheet 1

INVENTOR
A. W. Fowler

BY
Watson, Cole, Grindle & Watson
ATTORNEYS

May 3, 1966  A. W. FOWLER  3,249,533
METHOD FOR CLEANING WATER TO REMOVE FOREIGN PARTICLES
SUCH AS PAINT

Filed Jan. 17, 1962  10 Sheets-Sheet 2

INVENTOR
A. W. Fowler

BY
Watson, Cole, Grindle & Watson
ATTORNEYS

May 3, 1966    A. W. FOWLER    3,249,533
METHOD FOR CLEANING WATER TO REMOVE FOREIGN PARTICLES
SUCH AS PAINT
Filed Jan. 17, 1962    10 Sheets-Sheet 3

INVENTOR
A. W. Fowler

BY
Watson, Cole Grindle & Watson
ATTORNEYS

May 3, 1966 A. W. FOWLER 3,249,533
METHOD FOR CLEANING WATER TO REMOVE FOREIGN PARTICLES
SUCH AS PAINT

Filed Jan. 17, 1962 10 Sheets-Sheet 4

INVENTOR
A.W. Fowler

BY
Watson, Cole, Grindle & Watson
ATTORNEYS

May 3, 1966  A. W. FOWLER  3,249,533
METHOD FOR CLEANING WATER TO REMOVE FOREIGN PARTICLES
SUCH AS PAINT
Filed Jan. 17, 1962  10 Sheets-Sheet 6

INVENTOR
A.W. Fowler

BY
Watson, Cole, Grindle & Watson
ATTORNEYS

INVENTOR
A. W. Fowler
BY
Watson, Cole, Grindle + Watson
ATTORNEYS

3,249,533
METHOD FOR CLEANING WATER TO REMOVE FOREIGN PARTICLES SUCH AS PAINT
Alexander W. Fowler, 2141 I St. NW., Washington, D.C.
Filed Jan. 17, 1962, Ser. No. 166,778
5 Claims. (Cl. 210—44)

The present invention relates to the cleaning of water by the removal of suspended solid or other particles.

It is an object of the invention to improve the method of introducing contaminated water into a tank, to assist the formation of a floating mass of the contamination material, to simplify the handling of the mass and to facilitate the removal of the water from the tank after the cleaning process has been completed. The basic principle underlying the invention involves the attachment of the particles to air bubbles in the water, the subsequent flotation of the bubbles and the formation of the mass on the surface of the water.

The invention can be used with a number of liquids and types of contamination, where particle size and density, liquid density, aeration and particle collection characteristics are taken into consideration. In the case of water and possibly other liquids, the aeration and particle collection can be improved by additives where these do not interfere with other desirable characteristics of the circuit flow.

A further object of the invention resides in causing the water to enter the tank in such a way that the maximum of aeration with small bubbles of air is obtained by violent agitation of the incoming water mixed with entrained air. Chemicals are added in order to assist the formation of the bubbles and their collection characteristics which, in general, tend to produce undesirable frothing when the water is agitated. In accordance with the invention, high concentrations of the additives can be used without the formation of froth, and high degrees of turbulence in the agitation can be used while maintaining the quiescent conditions in the tank which are necessary for the formation of the carpet or layers of floating material.

A still further object of the invention resides in the feature of cleansing substantial amounts of flow of liquid in a minimum of space and with the simplest of equipment. Also, further objects are to present the material which is removed from the water in such a way that easy mechanical handling is possible, and to prevent a build-up of material in places which are not easy to maintain.

In an example of the invention which is selected for illustration, a settling tank is used which is at the bottom of a concrete lined excavation and is oblong and rectangular in shape. The water is introduced evenly along one of the longer walls of the tank where the turbulence and aeration take place. After removal of turbulence, the water is allowed to enter the main body of the water, no froth being formed in the last operations.

On entering the tank settlement area, fine air bubbles in the water start to rise to the surface and the carpet of material begins to form on top and on the far side of the tank, growing toward the entry side with increasing thickness. The flow of water is across the tank and this tends to thrust the carpet of material against the far wall where it rests on a floating chain which is in contact with the wall. The chain is about the same density as the carpet, and is endless, with the return strand passing back under water in a guide fixed to the wall. Movement of the chain by electric motor power causes the whole carpet to be moved toward one end of the tank where it is removed by a wide sloping belt conveyor, one of which dips into the water. The same drive operates both the chain and the conveyor so that they move at the same speed.

The water returns to the entry side of the tank at a lower level, continuing to release either floating or sinking material, and filter and suction units are positioned toward this side of the tank. The filters are automatically cleaned and the material removed enters the low level flow of water which is then partially mixed with the incoming aerated water. A partial second aeration of this material is thus obtained.

In a further arrangement of the invention, the water is made to enter the tank from both sides of the settlement area, and the carpet of floating material is formed in the center of the tank. The head of water can be high before entry, and in this case the distribution is carried out by a pipe instead of a flume, jets from the main pipe being used to provide the aeration. Very low heads can be used in another arrangement of the invention.

In order to make the invention more clearly understood various specific examples will be described in detail with reference to the accompanying drawings, in which.

Figure 1:
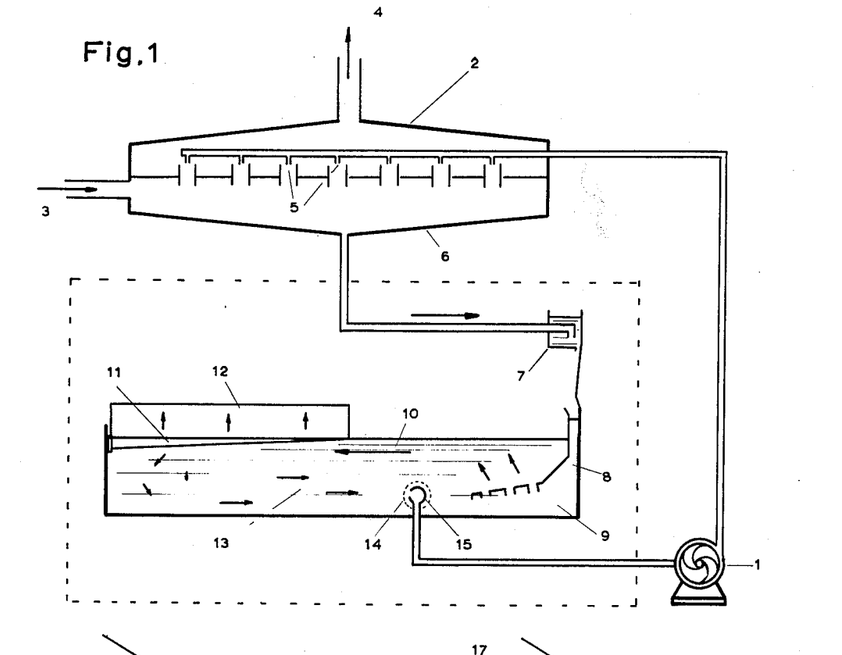
FIGURE 1 is a flow diagram showing a typical water circulation system with a water cleaning and air washing plant.

In FIGURE 1, the flow diagram illustrates the main components of a typical system where water is cleaned after passing through an air cleaning chamber. The detailed description of which follows will be concerned with the invention of this application. Water is circulated by the pump 1 and first goes to the spray chamber 2 where air contaminated with particles enters at 3, clean air leaving at 4. The water sprays 5 wash the particles out of the air and the contaminated water is collected on the trays 6 from where it flows to the water cleaning plant. The cleaning plant is enclosed on the diagram by the dotted line, and the first part of the plant is the distribution trough 7 in which the water is distributed along the length of one wall of the tank before being allowed to fall into the settling tank through openings in the bottom of the trough.

The water reaches the tank proper after passing through the second part of the plant at 8 which is an arrangement according to the invention where the water receives a high degree of aeration without excessive disturbance of the settling area and without the formation of froth. After aeration takes place the particles begin to attach themselves to the small air bubbles in a way known to those skilled in the art. The aerated water is introduced into the tank at low speed through the space 9 which distributes and mixes the aerated water in the water already in the tank, so that little turbulence is created.

In the tank the water flow across to the opposite side at levels close to the surface 10 and at the same time the bubbles laden with the particles of dust rise to the surface and start to form a carpet of scum 11. The flow of water tends to thrust the carpet 11 against the far side of the tank, that is, to the left, and the carpet 11 rests against a floating flexible chain which is capable of longitudinal movement. This enables the entire carpet 11 to be drawn toward one end of the tank for removal. This part of the plant is represented at 12 on the diagram, FIG. 1.

The water returns toward the entry side of the tank at lower levels 13, and continues to release material to the floating carpet. The next part of the plant is the filter 14 and suction unit 15, positioned not far from the entry side of the tank. The filters at 15 are cylindrical in form and are rotated so that they are continuously cleaned by internal jets of high pressure water. Material removed from the filters is partially put back into circulation in the tank so that a second aeration is made possible.

Figure 2:
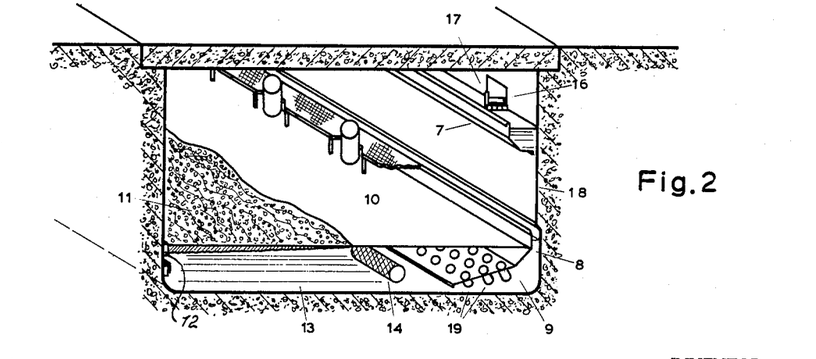
FIGURE 2 is a cross section and in perspective of a typical plant in accordance with the invention.

To provide a better idea of an actual layout of the plant which has been selected for detailed description, FIGURE 2 shows the tank as a perspective cross section of a concrete pit which forms the settling tank. The tank 18 includes parts corresponding to the same numbering of parts as FIGURE 1 and FIGURE 2 shows the cleaning plant which is enclosed by the broken lines in FIGURE 1.

Water enters along the duct 16 (FIGURE 2) and is diverted in each direction along the wall of the tank by the diverters 17. The trough 7 allows water to flow down the wall 18 into the slot which forms part of the aeration system 8. The aerated water passes through the space 9 before entering the settling area through the holes 19 which distribute the water over an area at the entry side of the tank. A flexible chain 12 draws the carpet 11 to one end of the tank and the return strand is shown below. The filter and suction units are shown at 14, and for clarity of illustration pumps and access walkways are omitted.

Figures 3, 4, 5:
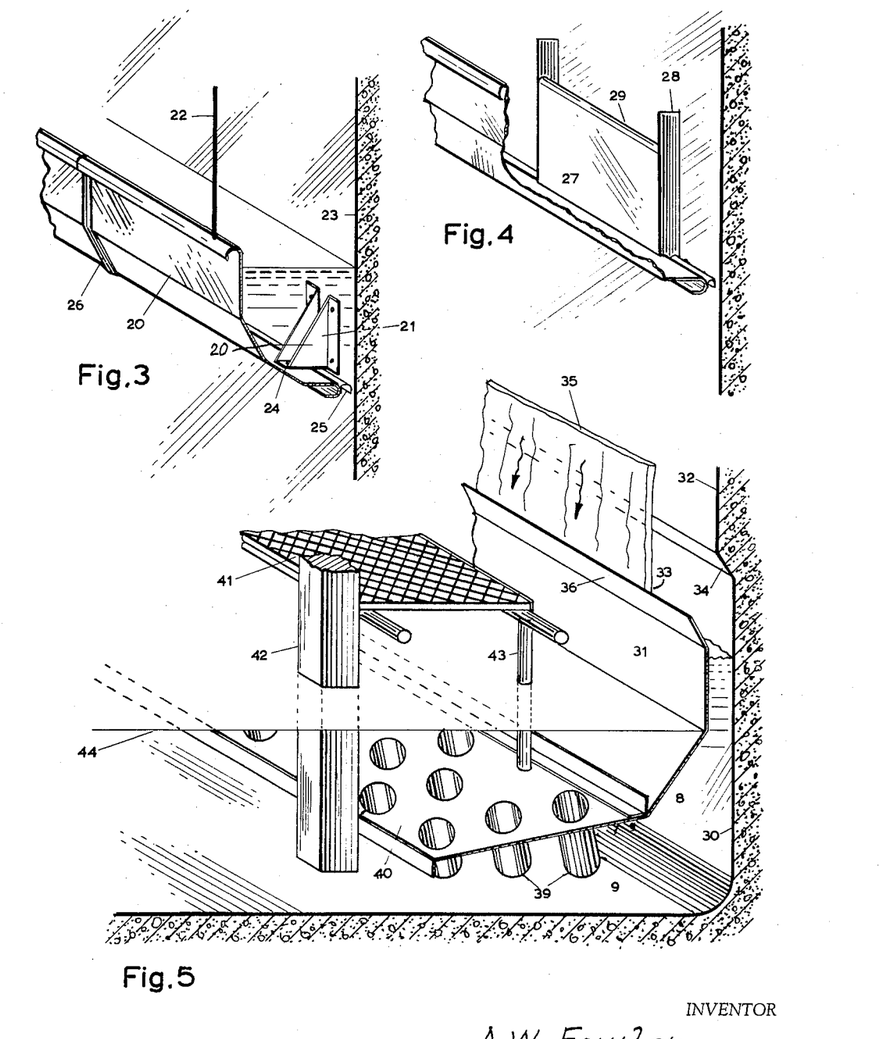
FIGURE 3 is a perspective view of a water distribution trough.
FIGURE 4 is a perspective view of a trough surface water drain unit.
FIGURE 5 is a cross section partly in perspective of a portion of an aeration, turbulence, diffusion and tank distribution structure at the entry side of the tank.

In the particular example described, the water distribution trough, FIGURE 3, is formed from a number of steel plates 20 in the shape shown on the drawing. The plates are supported at a height of about five feet above the level of the water in the tank by means of brackets 21 and hangers 22 fixed to the wall and roof of the tank chamber, respectively. The hangers 22 are flexible so that when a plate is detached from the wall bracket, it can swing down for cleaning and maintenance. A wing nut 24 secures the plates 20 to the bracket 21.

The wall brackets 21 hold the plates rigidly with respect to the wall leaving a gap of about one and one-half inches which is partly obstructed by a strip of thinner gauge sheet steel 25 fixed to the trough plate. This can be adjusted so that the rate of flow of water from the gap can be controlled along its length. Between the ends of the plates a small gap is left so that a strip of flexible material 26 can be inserted or removed while the plates are in place. The strip 26 forms a seal between the plates and is shaped, in section, so that it fits the edges of each plate. The plates are held to the wall brackets by a small number of studs fitted to the brackets and secured by wing nuts for easy removal for maintenance, the sealing strip being first removed from each side of the plate to be removed. Water enters the trough from a number of flumes along the length of the tank, and is diverted along the trough at the point of entry by means of cascade-type diverter blades. The flow of water along the trough is partly obstructed at intervals just above the gap by the wall brackets and also other small projecting blades so that the water leaving the trough falls substantially vertically.

At intervals along the trough, surface drain units, FIGURE 4, are positioned for the purpose of removing water which is flowing close to the surface of water in the trough. Owing to aeration taking place in equipment through which the water has passed before entering the cleaning plant, the water has a tendency to form a carpet of floating material in the trough if it is not removed.

The drain unit consists of a plate 27 fitted with end pieces 28, which is lowered into the trough and placed against the wall above the adjustable slot. The lower edges of the unit are made to fit the trough as closely as possible so that leakage is reduced, but not necessarily eliminated. The side plates should have a reasonably good fit on the wall for the same purpose. The top of the plate 27 is curved to form a weir 29, over which water spills into the space between the unit and the wall, and the water then continues through the adjustable slot. Under each unit, of which there may be several, the slot is opened considerably wider than where there is no unit, so that the flow of water is kept reasonably constant per unit length of trough. The weir 29 of the unit can be adjusted for height so that when the plant is running at its correct flow rate, the flow of water over each of the weirs is approximately equal to the flow from an equal length of the trough slot which is not under a unit, giving a uniform flow from the entire length of the trough. The weirs act as a regulation for the height of water in the trough since, if there is a tendency for the level to rise, more water will flow over the weirs, and vice versa.

After leaving the distribution trough the water falls into the aeration area shown in FIGURE 5, which is a space between the wall of the tank 30 and the plate 31. Before entering the aeration area the water flows down the steeply sloping wall 32 which guides the sheet of falling water 35 into the desired place in the slot, and helps to reduce splashing. About six inches above the level of water in the slot 33, the wall 32 is sharply cut back at 34 to meet the wall 30 of the tank, resulting in an enclosed air space between the sheet of water and the wall.

The sheet of water, which is continuous along the length of the tank, is directed so that it falls close to the plate 31 after the short free fall in the last part of its travel. It enters the water already in the slot with considerable velocity and carries with it entrained air, which is thoroughly mixed with the water when it is losing its velocity energy in turbulence. Some of the air escapes the mixing process, and this must have a free surface so that it can be removed before it interferes with the production of the fine aeration which is required for the process. The free surface is about four times the thickness of the sheet of water. In rising to the surface, froth is normally produced owing to the presence of the additive for assisting the formation of fine aeration, but in accordance with this invention, the free surface of the water in the aeration slot is enclosed in the space 33 between the falling sheet and the wall 30. This has the two-fold purpose of preventing the escape of the foam, and providing a second surface of the falling sheet open to air for entrainment.

By directing the sheet of water 35 to fall close to the plate 31, any foam which tends to form between the sheet of water 35 and the plate is prevented from rising and spilling out of the slot. At the same time the efficiency of air entrainment is increased due to the proximity of the plate to the falling water, and a scrubbing action takes place which helps to keep the plate clean. The plate 31 has a sloping top at 36, to catch any splashes from the falling sheet of water.

Air which is released from the water into the space 33 is re-entrained in the falling sheet of water at a rate which is not necessarily the same as the rate of release, and the excess is blown from time to time through the sheet of water. Meanwhile the additional pressure assists the entrainment and tends to keep the sheet toward the plate 31.

The over-all effects of this system are (a) to provide violent agitation and mixing of the falling sheet of water and entrained air so as to form the maximum aeration, (b) the entrainment of air from both sides of the sheet of water, (c) the prevention of frothing, and (d) the cleaning effect on the plate enclosing the turbulent region.

The second part of the water entry system is the diffuser and distributor section shown in the lower part of FIGURE 5. Just below the aeration section, the plate 31 curves away from the wall 30 to form the wedge-shaped chamber 8 which is about twelve inches wide at its lower end. In this area the water velocity and turbulence are gradually reduced, and the fine bubbles of air which have been formed in the aeration section are carried downward by the flow of water. The larger bubbles rise more rapidly in the water and are sorted out to rise into the aeration region. These bubbles are undesirable because they cause turbulence in the settling area, and do not assist in the formation of the carpet of floating material. In the aeration region they are once more subjected to turbulence and possible conversion to fine aeration, while some of the air escapes to the surface.

As soon as the fine bubbles have been formed, particles of the suspended matter begin to attach themselves in a manner known to those skilled in the art.

The finely aerated water next passes into the area 9 under the plate 40 where turbulence is further reduced, and the particle attachment process is continued. The plate slopes downward toward the far side of the tank, and carries tubes 39 which project downwardly into the aerated water, as shown in the drawing, FIGURE 5. The tubes 39 all terminate at a height of about six inches above the floor of the tank and the water is made to descend to that level before entering the tubes. It should be noted that the mean density of the aerated water is less than the tank water density.

The tubes are arranged so that the aerated water is distributed over an area at the entry side of the tank and made to mix with the tank water on leaving the distribution tubes. The distribution and mixing procedures permit the entry of the aerated water into the tank so that only a small amount of turbulence is generated, giving the best conditions for the formation of the carpet of floating material.

In construction, the plate 40 is supported rigidly from the bottom of the tank, and the plate 31 is carried on a hinge at the leading edge of the plate 40. This allows the plate 31 to be swung back for inspection. Also, FIGURE 5 shows a walkway 41 supported on supports 42 and 43 and this walkway allows access to the pumps. The plane 44 indicates the approximate top surface level of the water.

Once the aerated water has entered the tank, owing to its lower density, it tends to rise to the surface. The distribution and mixing colander shown in FIGURE 5 reduces the velocity and turbulence with which the water rises to the surface, and helps to maintain quiescent conditions in the tank. After rising to the surface the water flows at shallow depths toward the far side of the tank, and a carpet of floating material begins to build up from that side, as the particle-carrying bubbles rise to the surface.

The flow of the water tends to thrust the formed carpet 45 (FIGURE 6) against the far wall of the tank, where it rests against a floating chain 46, and it gradually spreads across the tank as shown with decreasing thickness as it does so. The scum carpet 45 has the beneficial effect of reducing the speed of the surface water and further reducing general turbulence in the tank and it is not desirable to start removing it until it has reached a distance of about two feet from the nearest surface obstructions at the entry side of the tank. The operation of the carpet drag chain 46 and removal conveyor are shown in FIGURE 7 and this is controlled by two photocells 47 (FIGURE 6) suspended a short distance above the water level, and actuated by underwater light sources 48.

Figure 6:
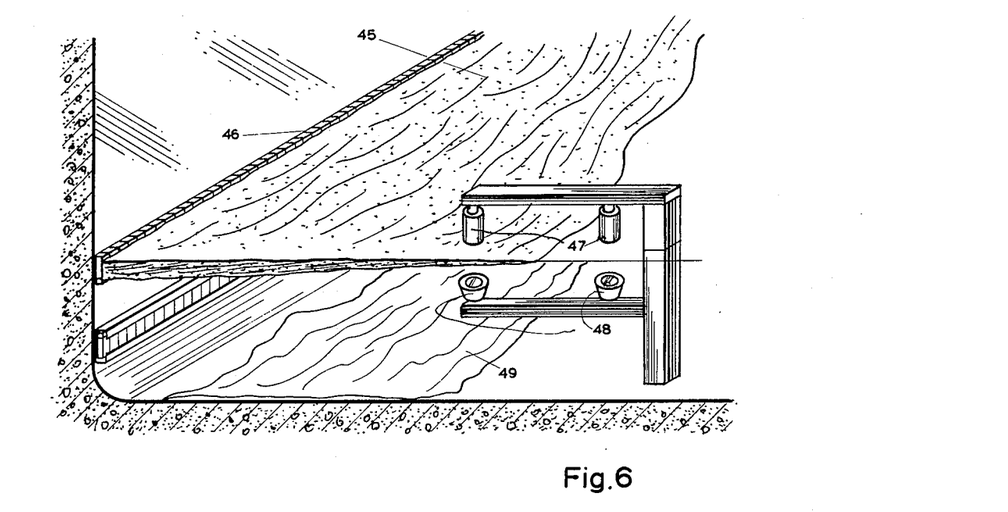
FIGURE 6 is a cross section partly in perspective of a portion of the tank showing the carpet of floating material, the floating carpet drag chain and the elements of the de-scumming control system.

The scum removal equipment drive has two speeds of operation, "fast" and "slow," and the fast speed is sufficient to exceed the fastest rate of build-up of the carpet. The slow speed allows the carpet to build up even though the amount of material in the water is below normal, and the circuits of the photocells and control equipment are arranged so that when the cell nearest the entry side is shielded by the carpet the removal speed is switched to "fast." When the cell nearest the removal side is uncovered, the speed is switched to "slow." In this way, positive action of the control equipment is obtained, and continuous slow movement of the mechanical equipment.

Figure 27:
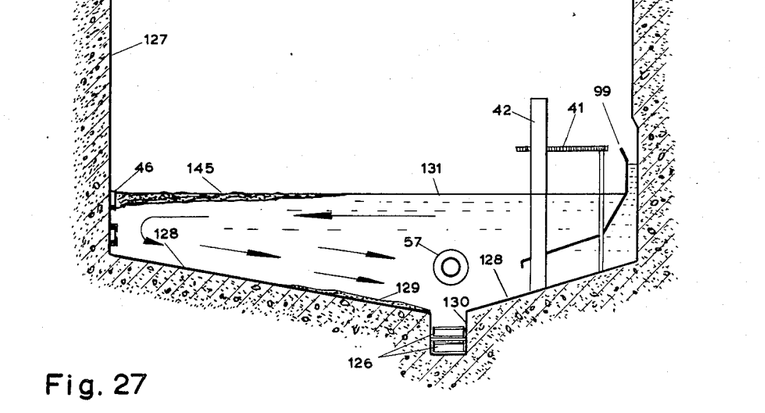
FIGURE 27 is a cross section showing a modified tank and sediment removal means.
Figure 28:
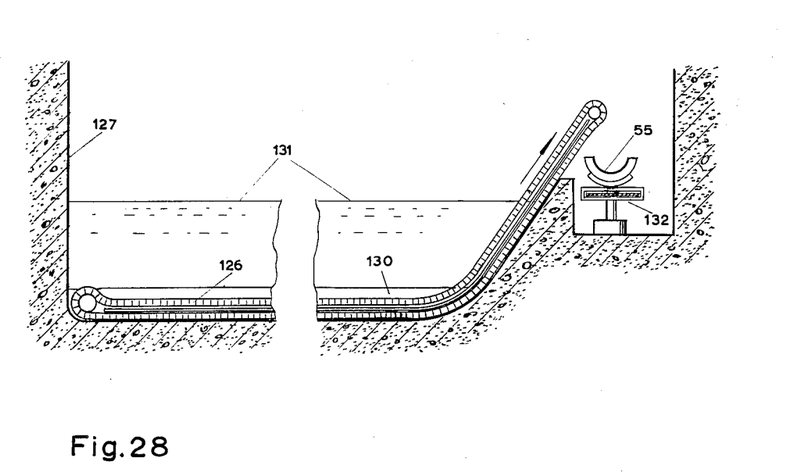
FIGURE 28 is a longitudinal section of the tank and removal means of FIGURE 27.

When the water has traveled under the carpet and has reached the far side of the tank, it returns toward the entry side at lower levels, continuing to release material to the surface, and some to the floor of the tank at 49, FIGURE 6. The small proportion of material which has sunk to the bottom is removed from time to time when the tank is drained for cleaning and maintenance, unless automatic mechanical de-sludging equipment is provided, as indicated in FIGURES 27 and 28.

Figure 7:
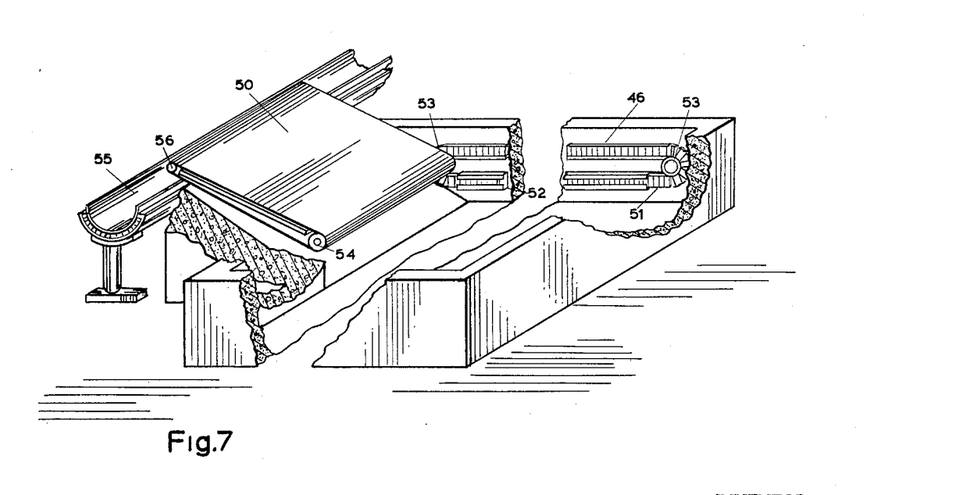
FIGURE 7 is a perspective view showing the removal mechanism of the scum carpet.

The de-scumming equipment consists of two units, as shown in FIGURE 7, which are the floating carpet drag chain 46 and the carpet removal conveyor 50. The drag chain is composed of flat links of chain on which are mounted rectangular blocks of hardwood or plastic faced with steel so that the mean specific gravity of the complete chain is about the same as the carpet of scum, that is, about .9. The chain is endless and the return strand 51 passes under water guided in an inverted channel section 52 to the idle sprocket 53 at one end of the tank. The chain is driven at the discharge end of the tank by a sprocket 53 which rotates on a shaft in the tank which carries one end of the removal conveyor 50, so that the chain and the conveyor are driven at the same speed. Pitch diameters of the sprocket and the drum 54 carrying the removal conveyor are the same.

The removal conveyor 50 is composed of a belt of flexible material and is set in the tank at an angle so that one end is below water level in the tank, while the other end projects over the edge so that discharge of the carpet of material can take place. The discharge is collected on a narrow conveyor 55 which runs parallel to the discharge side of the tank under the outer end of the removal conveyor 50. Where the belt of the removal conveyor 50 is carrying material, it is supported from underneath by a ramp which is part of the structure of the tank.

Before the removal conveyor re-enters the tank, the belt is cleaned by being passed over a roller 56 which is vibrated longitudinally by electrical means, not shown. This is also the tension roller.

In a tank where there is a large rise and fall of water, the end sprocket 53 and the end of the removal conveyor in the tank are supported by floats, so that the two ends of the chain rise and fall with the water. Sufficient slack is used in the chain to permit a fixed guide return.

The filter and suction units 57 (FIGURE 8) are positioned about three feet from the edge of the distribution plate of the water entry system 58 and about six inches above the bottom of the tank. The pumps 59, which are mounted vertically close to the access walkway, each have two cylindrical filters 57, as shown, and these are capable of rotation about their axes by means of a ratchet device operated by an eccentric mounted on a slowly rotating shaft.

The filters are mounted on the suction pipe leading to the pump, and this pipe is hinged at 60 just below the pump to allow both filters to swing up, as shown by dash lines 61, FIGURE 8, and over the access walkway for cleaning, maintenance and filter replacement if necessary. A sealing ring of flexible material is used at the pump suction flange to prevent leakage of unfiltered water into the suction system.

Figures 8, 9:
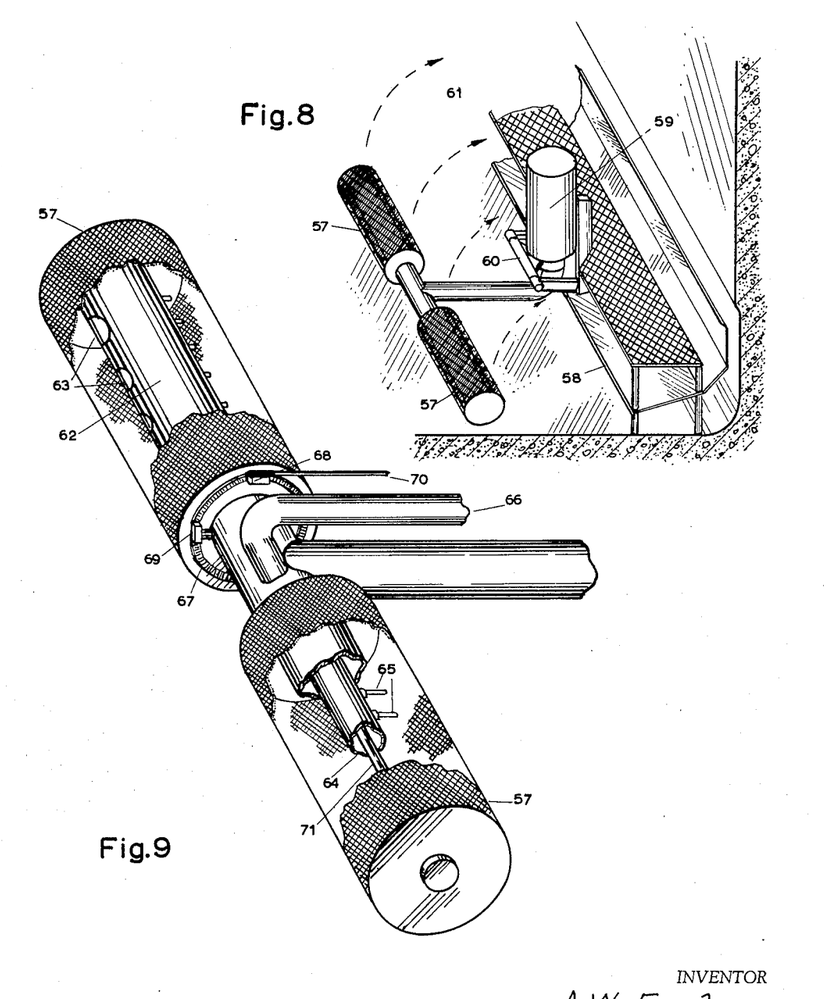
FIGURE 8 is a cross section of a portion of the tank showing the filter and pump units in relation to the water entry equipment.
FIGURE 9 is a perspective view showing the filter units and flushing arrangement.

The access way, FIGURE 8, gives access to the pumps, flow control valves, filters, aeration unit and distribution system.

FIGURE 9 shows the filter units 57 cut away to show the suction pipe 62 and holes 63, and the backflush pipe 64 having nozzles 65. The holes 63 in the suction pipe are graduated in size so that an even flow of water is drawn from the tank along the length of the filters, and the holes face the flow of water at that point in the tank. By placing the filters in this position in the tank, the water has traveled along the top of the tank and part of the way back again, and has maximum time for releasing its contaminating material. The purpose of the filters is to catch any lumps of material which may have formed on the surface and become waterlogged, thus sinking slowly and re-entering the water flow. These lumps have a density close to that of water and might otherwise enter the suction elements and cause blockages. The filters also catch a certain amount of material by the build-up of fine material, which has not been removed in the tank, on the mesh of the screen. The material is removed by the use of jets of high pressure water which are placed inside the filter, and the material is blown outward so that it is broken up and at the same time introduced back into the flow of water in the tank. On this side of the filters the flow is toward the distribution plate and mixing with aerated water again takes place, causing some of the filter material to be floated which increases the over-all efficiency.

The backflush nozzles are fed from the pump discharges through pipe 66 and the nozzle pipe is mounted inside the suction pipe 62. The nozzles project through the suction pipe wall and point back toward the entry side of the tank. The jets are fan-shaped to obtain the correct coverage. Rotation of one of the filters is imparted by a ratchet wheel 67 and a pawl 68, operating with a backstop pawl 69. The operating pawl is driven from a rod 70 which is oscillated intermittently by means of an eccentric mechanism, not shown. The driven filter is clamped to the ratchet wheel and its other end fits over a shaped plate mounted on the end of a shaft 71 which passes through the backflush jet feed pipe, FIGURE 9, to drive a similar plate at its other end, and this end drives the second filter so that the two rotate together one step of the ratchet for every revolution of the eccentric shaft.

Figure 10:
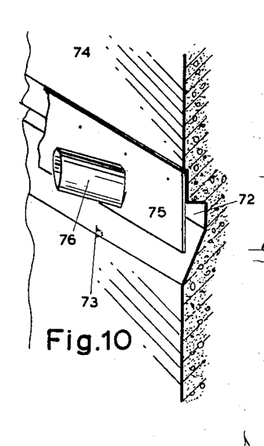
FIGURE 10 is a perspective view of a portion of the tank showing the system for pre-aeration of the incoming water.

In cases where the distribution is from a trough and the water falls initially down a section of the wall, further aeration of the water prior to entry of the aeration slot can be obtained by the use of the air feed slot shown in FIGURE 10. A recess 72 is cut in the wall along its length a few inches above the aeration slot. The water flowing down the wall 74 flows across the plate 75 and across the gap 73; in doing so, entraining air from the recess. Air is fed into the recess 72 through a number of short streamlined tubes 76 fitted on the plate 75 which projects through the water flowing down the wall.

The foregoing method of water entry can be used in a tank of any size or shape, but it has been found that a tank of oblong rectangular shape, not great in depth, is useful in order to benefit most from the scum carpet handling system. If the depth is taken as D, then a width of four D or five D and a length of from 20 to 50 D will approximate proportions for the construction of the tank. If D is in feet, then the flow of water per foot of tank that can be handled lies somewhere between 15 and 25 D gallons per minute, depending on the method of entry, contaminating material, additives, etc. Any type of tank can be used for the process, provided there is a free surface for the liquid to be cleaned, and provided the liquid can be introduced along one or both of the long sides of the tank.

Up to now the invention has been described as working with a trough fitted along one side of the wall as the means of distribution of the water in the tank, and requiring a fall of water to produce aeration. This system is suitable where the water enters the tank in one or more flumes having a free surface from four to seven feet above the surface of water in the tank. However, this is not always convenient and where less than four feet head is available, the aeration tends to be too little for efficient operation of the cleaning system.

Figure 11:
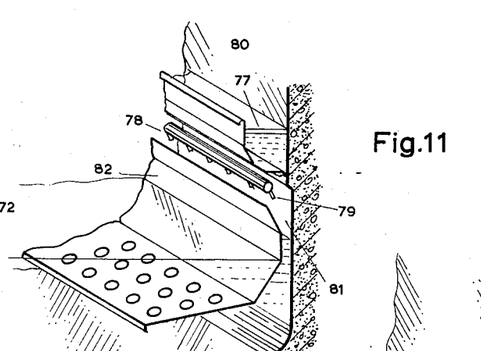
FIGURES 11, 12, 13 and 14 are perspective views showing a number of arrangements for the distribution of low head water into the tank with jet assisted aeration.
Figure 12:
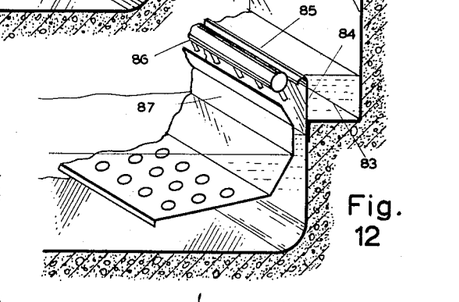
Figures 13, 15:
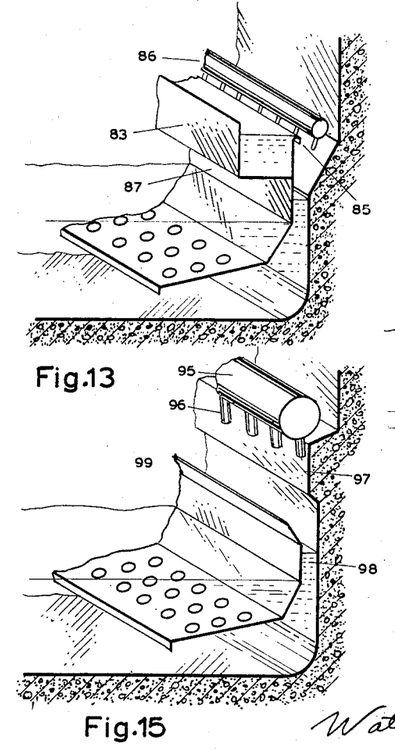
FIGURE 15 is a perspective view of a portion of the tank showing a high head distribution into the tank.

Three arrangements where the aeration is increased for water arriving in flumes with less than four feet of (static) head are shown in FIGURES 11, 12 and 13, which serve to illustrate a variety of arrangements. In FIGURE 11 the flume 77 is high enough to leave room for the pipe 78 carrying high pressure water for the aeration nozzles 79. Water from the trough flows down the sloping wall 80 into the space 81 much the same as previously described, but the jets of the aeration system impinge on the water surface in the aeration slot close to a plate 82, and at about the same place as the incoming water. This creates the necessary aeration and allows the use of the same trough design as before.

FIGURE 12 shows a trough 83 formed in this case by the plate 84 and a recess in the concrete wall of the tank chamber, where the water enters the aeration slot by spilling over the weir 85. The latter is made by a strip of thinner gauge material which is curved and fitted to the top of the plate 84 so that simple adjustment of the height and rate of flow can be made. The curve in the weir plate forms the aeration slot air space. As before the aeration is created in part or whole by the high pressure water jets fed by the pipe and nozzle system 86, the jets meeting the incoming water close to the plate 87 and at the water surface in the aeration slot.

FIGURE 13 shows the same as FIGURE 12 but with the jets and the flume in reversed positions. The flume can be partly submerged in the water in the settling region, economizing on space, but with reduced access for maintenance.

Figure 14:
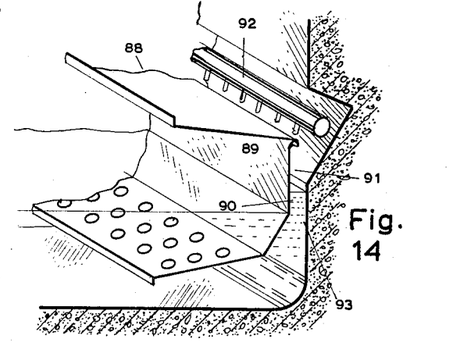

In a further form, FIGURE 14, the water cleaning plant is positioned immediately under the air washing or other plant which is using the cleaned liquid and the water is shown being collected on the spray trays 88. On the trays 88 it flows toward the edge 89, where it falls in a sheet into the aeration slot 90, enclosing the air space 91. Aeration is created by the high pressure water jet system 92, which is directed so as to meet the falling water sheet at the surface of water in the aeration slot close to the wall 93.

The principle of jet assisted aeration can be used in cases where there is restricted head room, but there must be sufficient head of water in the trough arrangement to obtain even distribution along the side of the tank.

In cases where a series of jets for aeration, turbulence or cleaning purposes are used, the water may be taken from the clean side of the main circulation pumps and their capacity increased accordingly, or it can be taken from the incoming water by an auxiliary pump system. The latter has the advantage that the concentration of particles in the aeration section of the plant is not reduced and this is beneficial as to efficiency.

Cases where the head of incoming water is higher than that which leads to a convenient height of trough, about five to eight feet above the level of water in the settling tank, it can, in many cases, be reduced to give the desired height of fall of water into the tank by means of head reducing turbulence tanks. One of the flume methods can then be used for distribution.

Apart from the described methods, other ways of introducing the water may be used without exceeding the scope of the invention. Thus, the water may be poured from the trough over a weir at a high or medium level, and at the same time be allowed to flow through holes at the bottom of the trough. The weir allows for surface water clearance all the way along the trough, and the holes keep material from collecting at the bottom of the trough. In this form the trough can be set in the wall of the tank chamber and the bottom jets can play outwardly toward the center of the tank, and be deflected down the wall by diverters to meet the sheet of water pouring over the weir.

In another system a long free fall of water can be used to fall in a sheet on a sloping section of the wall, just shortly above water level, the deflected sheet forming a cover over the top of an enclosed air space according to the invention. Much higher heads of the water to be cleaned can be dealt with by the use of a pipe feed system which brings the water into the tank and distributes it along one of the longer walls of the tank through a series of nozzles. This is shown in FIGURE 15, in which 95 is the distribution pipe and 96 shows the nozzles, the water being projected onto the wall 97 from a row of such nozzles so that it is spread along the wall before entering the aeration region 98. The jets of water are preferably not flat, to reduce the chance of blockage by lumps of matter, and the pitch of the nozzles is such that a substantially complete sheet of water is formed before the wall 97 is cut back to form the recess as described with reference to FIGURE 5. The nozzles are positioned at a slight angle to the wall, as shown, so that not too much doubling up of the water occurs when the jets intermingle on leaving the wall. The plate 99 which forms the aeration area is also a few inches higher than in the medium head design so that the high pressure jets do not lead to random sprays leaving the entry system.

The system can deal with very high heads of water, and the energy released from the high head means that the efficiency of aeration is high. So that the turbulence of the aerated water does not reach the tank the depth and the width of the aeration slot are increased for the higher heads.

After the aerated water has passed through the diffuser stage, and has lost the majority of the larger air bubbles, it flows out under the distribution plate ready for a smooth entry into the main part of the tank.

Certain other methods of obtaining the distribution of the incoming water in the tank are illustrated in FIGURES 16, 17, 18 and 19. The main object is to introduce the water with as little turbulence as possible and this is done by spreading the aerated water at low level over a horizontal area of the tank near the entry side. One method of doing this has already been described which is considered the best illustration of the invention, but the methods shown in the drawings referred to serve to show that there are a number of embodiments which achieve the same or similar results.

Figure 16:
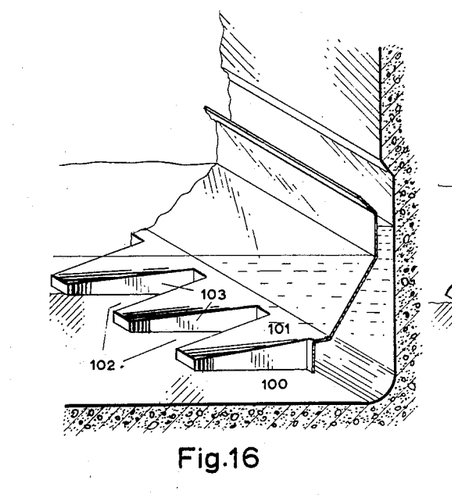
FIGURES 16, 17, 18 and 19 are perspective views partly in section showing various forms for the distribution of aerated water prior to entry into the settlement area of the tank.

In FIGURE 16, the water flows out into the area 100 under the distribution plate 101 in which there are a series of large indentations 102. The boundaries of the indentations carry plates 103 which extend to about six inches from the bottom of the tank (in the case of a tank having three feet of water depth). In operation, the aerated water is held in the area until the incoming water from the aeration section causes the water to flow out under the lower edges of the indentation boundary plates. Thus, the water enters the tank all along the boundary of the serrated distribution plate 101, causing a spread.

Figure 17:
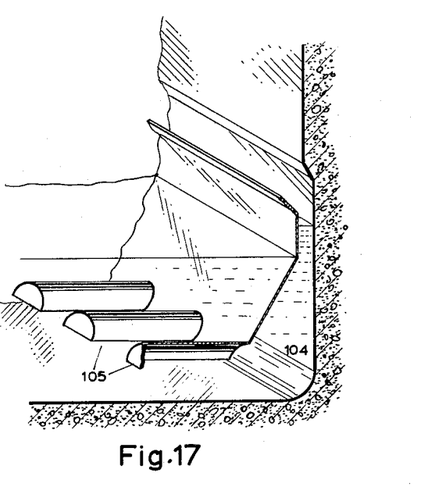

In FIGURE 17, the aerated water is first taken to a low level in the tank in an extension of the first diffuser region 104 and then led out into the tank at that level under a series of inverted channel or U-shaped sections 105. The aerated water spills out from under the edges of the channels and into the tank, effecting the desired distribution.

Figure 18:
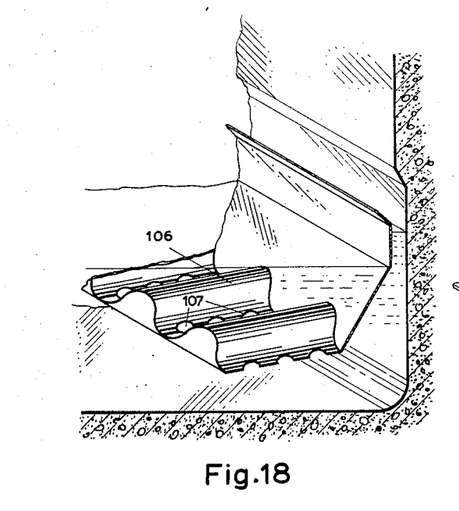

In FIGURE 18, the aerated water flows out into the tank at low level under the corrugated plate 106, as shown in the drawing. Holes 107 are provided at intervals along the lower parts of the corrugations and the water is made to flow downwardly before it can escape from the holes. The holes are graduated in size to assist distribution. Water containing aeration of too large a size returns under the higher ridges of the corrugations to the aeration slot.

Figure 19:
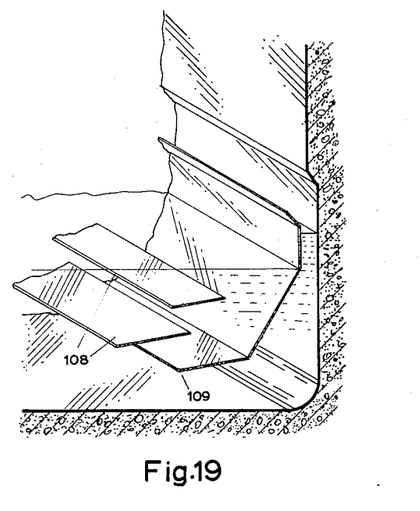

In FIGURE 19, one or more baffles 108 placed above the final edge of the plate 109 cause a spreading of the aerated water in a series of lines parallel to the side of the tank.

Figure 20:
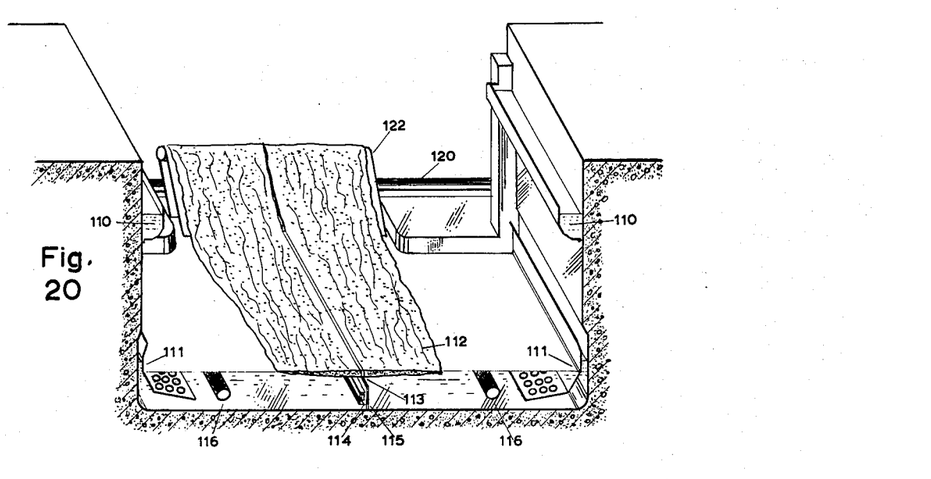
FIGURE 20 is a cross section partly in perspective showing a cleaning plant with a two-sided water entry.

As previously indicated, the incoming water may be distributed along both of the walls of a tank and FIGURE 20 is an illustration of this principle. In the case of two wall distribution the proportions of each half of the carpet are arranged to give an entry of water along the longer side of each rectangle.

The water enters the tank along opposite walls and is distributed at 110 by any of the means previously described. The water is aerated and distributed in the tank at 111 by any of the tank distribution means described, and the carpet of floating material collects in the center 112. The drag chain is shown at 113 floating in the center of the tank and the return run 114 is supported under an inverted guide plate on the plate 115 which divides the water at low level down the middle of the tank. The filters 116 are shown, but for clarity the pumps, pipes and access walkways are omitted. In the case of external pumps, the dividing plate 115 may be partly reduced and a large central suction pipe placed in the center of the tank.

The central carpet as formed is pulled to one end of the tank by the chain, and lifted out as before by a wide belt conveyor and dropped on the conveyor 120. The chain is driven by a sprocket in the center of the immersed roller of the belt conveyor, which is divided into two parts, each running on the same two rollers.

Figure 21:
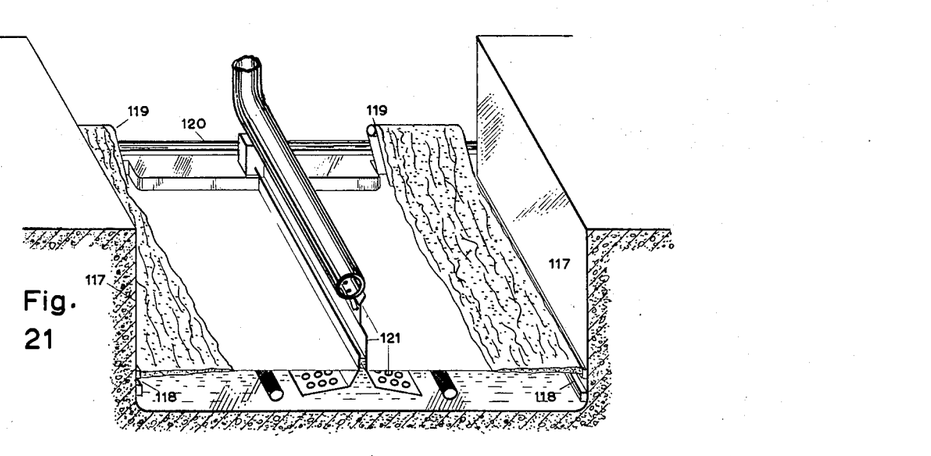
FIGURE 21 is a cross section partly in perspective showing a cleaning system with two-sided de-scumming arrangement.

FIGURE 21 shows a system of a tank where the entry of water takes place along the center. Here again, the entry can be by any of the methods previously described, except that in place of concrete walls it would be more normal to use steel plates. Water flows each way from the entry system 121 toward the walls 117 and two carpet handling chains 118 are employed. As before, pumps, pipes and access walkways have been omitted for clarity. A large central suction pipe may be placed under the entry system in the center of the tank if external pumps are to be used. The scum removal conveyors 119 lift the scum carpet out of the tank and drop it onto a conveyor 120 for removal.

Figure 22:
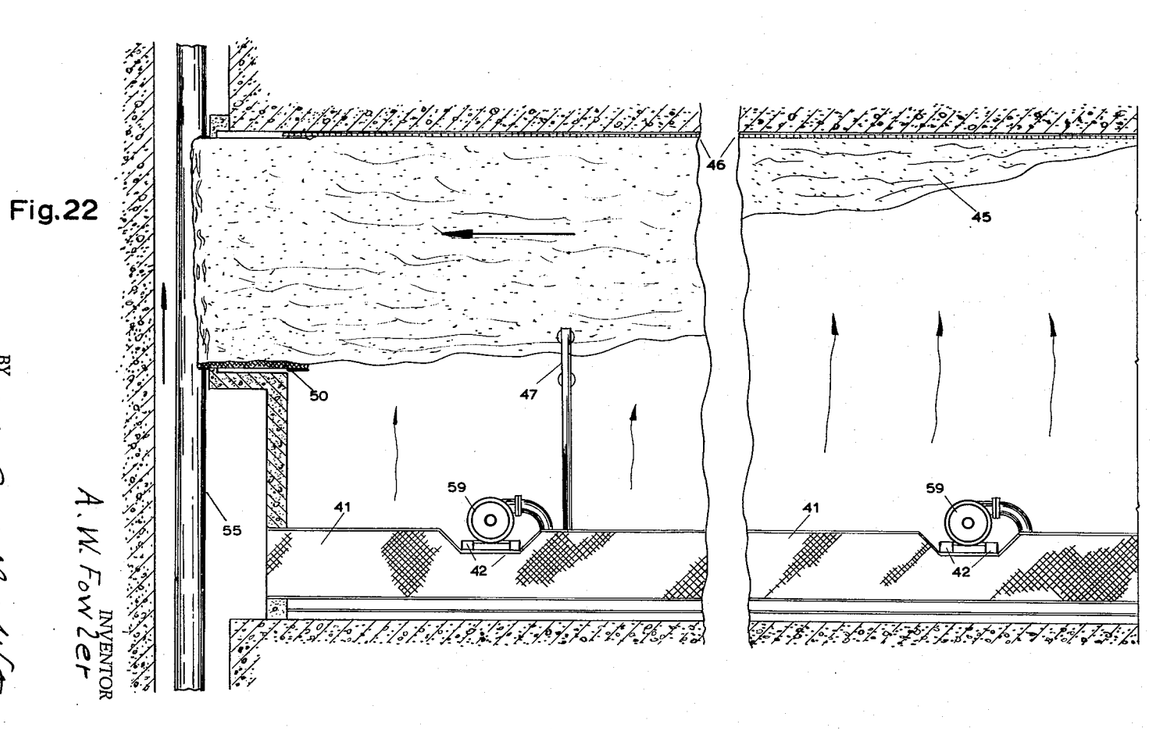
FIGURE 22 is a diagrammatic plan view of the entire tank installation showing scum removal on one side of the tank.

FIGURE 22 shows the entire tank assembly showing by arrows the movement of the water and scum carpet. In this example the water enters along one side, as shown in FIGURE 2.

Figure 23:
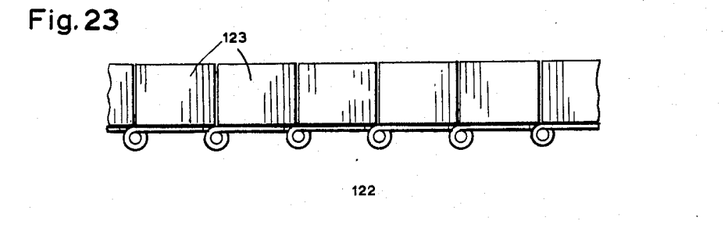
FIGURE 23 is a side view of a suction of a floating chain provided with float blocks.
Figure 24:
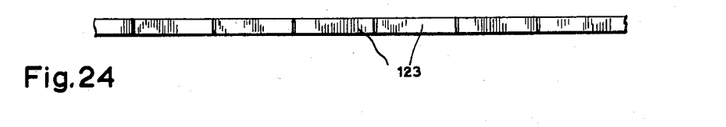
FIGURE 24 is a top plan view of the chain of FIGURE 23.

FIGURES 23 and 24 show one form of floating chain in which the links 122 are each provided with a float 123 made of wood or plastic or any other suitable bouyant material so that the chain shall float.

Figure 25:
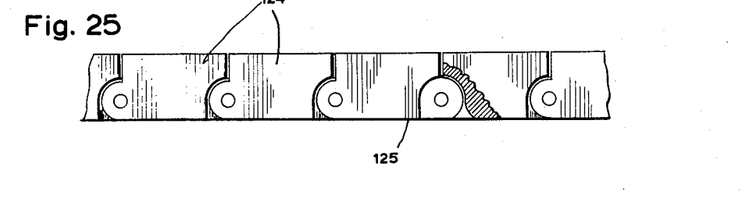
FIGURE 25 is a side view of a section of a modified chain structure.
Figure 26:
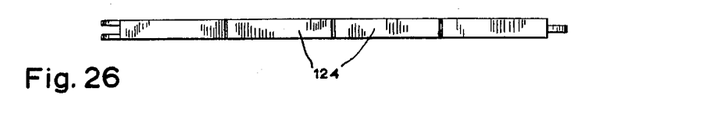
FIGURE 26 is a top plan view of the chain of FIGURE 25.

FIGURES 25 and 26 show a series of interconnected links 124 made of a floating material and connected as to adjacent links by pins 125.

It is believed that the operation of the cleaning plant for water to remove particles therefrom is obvious from the foregoing description and the drawings. One application of such a plant is one in which air from paint spraying operations is forced out of the chamber where the spraying takes place and by washing with water, the air is in a condition to be released into the atmosphere. This requires a large quantity of water which must be processed to remove the particles therefrom and, as shown in FIGURE 1, the air containing paint particles enters at 3 into the washer 2. The cleaned air leaves at 4 and the water flows down into the tank where it is treated as described, the final scum carpet 11 being formed at one side of the tank to be removed from the water so that the latter may be forced by pump 1 back to the spray chamber 2. Recirculation of the water is necessary in this case owing to the use of large volumes of water which are required in the air washers.

The structure shown in FIGURES 27 and 28 shows an endless conveyor in the bottom of the tank 127 of which the bottom surfaces 128 slope into a depressed pit 130 in which the endless chain conveyor 126 travels, as shown in FIGURE 28. The water level 131 is indicated under which the scum carpet 145 builds up and the sediment sludge layer 129 which forms on the bottom of the tank is gradually carried away by the endless conveyor 126 up and out of the tank at the right end, FIGURE 28, so that the sediment material may fall on a trough 55 for removal from the plant.

The chemical additives used in the system described above have two principal functions: first, to facilitate the production of fine bubbles of aeration during the process of the water entering the tank, and second, to provide a condition at the surface of each bubble which improves the collection and entrainment of solid particles in the water. A detergent such as a soap or synthetic product may be used for the first of these effects, and sodium metasilicate is an example of a chemical which improves the collection and entrainment properties of the bubbles. An additional benefit results from the use of mixtures of the detergent and a chemical substance in that surfaces exposed to the water circuit are rendered less vulnerable to a contamination with the solids carried in the water.

Figure 29:
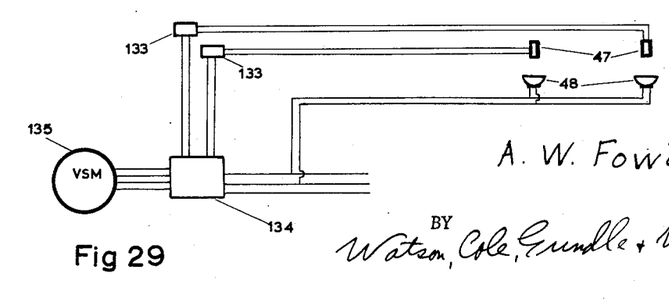
FIGURE 29 is a circuit diagram.

FIGURE 29, which is a wiring diagram, shows the basic elements of the control circuit by which the speed of removal of the scum carpet is altered from time to time in order to control the rate of build-up of the carpet across the tank.

The scum carpet drag chain and the carpet removal conveyor are both driven by a two-speed electric motor 135, which is controlled by the switching unit 134. The switching unit is operated by impulses from the thermionic relays 133 connected to the photocells 47 as shown. The photocells alter the speed of the motor in such a way that the higher motor speed is imparted when the edge of the carpet of scum is interposed between the photocell nearest the entry side of the tank and its light source 48. When the scum carpet has receded so that light from the light source 48 falls on the photocell 47 furthest from the entry side, a lower speed will be imparted to the operating motor.

I claim as my invention:

1. A method for cleaning water to remove foreign particles such as paint, which comprises aerating the water as it enters a tank along one side wall thereof so that the particles of foreign matter float on the surface of the water in the tank toward an opposite side wall, building up a carpet of aerated particles as a scum along the opposite side wall in a direction parallel to this wall and extending to an end wall perpendicular to the side walls, and drawing the carpet of scum along the opposite wall and over the end wall to remove it from the tank.

2. A method according to claim 1, in which the step is included to detect an edge of the formation of the carpet of scum during the build up of the carpet to thereby control the rate of removal of the carpet from the tank.

3. A method according to claim 1, in which the step is included of recirculating the water from the tank to pick up particles of paint for removal in the tank.

4. A method according to claim 1, in which the step is included of conveying away the carpet of scum after it is removed from the surface of the water in the tank.

5. A method according to claim 1, in which the step is included of adding chemicals to the water as it enters the tank to assist the formation of bubbles with a quiescency of the incoming water to prevent turbulence.

References Cited by the Examiner

UNITED STATES PATENTS

| 2,086,514 | 7/1937 | Saunders et al. | |
| 2,370,974 | 3/1945 | Langdon | 210—44 |
| 2,519,606 | 8/1950 | Sharp | 210—44 X |
| 2,628,190 | 2/1953 | Langdon | 210—44 |
| 2,880,876 | 4/1959 | Dujardin | 210—525 X |
| 2,920,763 | 1/1960 | Lind et al. | 210—221 |
| 2,982,723 | 5/1961 | Arnold et al. | 210—441 |
| 3,015,396 | 1/1962 | Quast | 210—221 |

FOREIGN PATENTS 686,540   1/1953   Great Britain.

MORRIS O. WOLK, *Primary Examiner.*